United States Patent Office 3,338,756
Patented Aug. 29, 1967

3,338,756
METHOD FOR REMOVING COATINGS
Edward Leon, Tonawanda, N.Y., assignor to Hooker Chemical Corporation, Niagara Falls, N.Y., a corporation of New York
No Drawing. Filed Oct. 28, 1963, Ser. No. 319,591
7 Claims. (Cl. 148—6.15)

This invention relates to an improved method for removing coatings, such as paint, enamel, varnish, lacquer, and the like from surfaces, and more particularly, relates to a method for removing such coatings from metal surfaces utilizing a composition containing a halogenated hydrocarbon.

Heretofore, many compositions have been produced for removing protective coatings, such as paints, enamels, varnishes, lacquers and the like from surfaces, and particularly, metal surfaces. These compositions have been referred to, generally, as paint stripping compositions. Some of these stripping compositions have been based on relatively flammable solvents, such as phenolic, benzene, or ketone solvents. Although such stripping compositions have often been effective in removing paint or similar protective coatings, the flammability of these compositions, due to the solvents which they contain, is definitely disadvantageous.

Additionally, many of the prior stripping compositions also contained a waxy substance, such as paraffin wax, to help retard the evaporation of the solvent. Such compositions, after stripping the paint or similar coatings, frequently left a deposit of the waxy material on the surface being treated. These deposits were usually undesirable in that they made it difficult, if not impossible, to obtain a smooth, adherent new protective coating on the surfaces.

In an effort to overcome the aforementioned difficulties, and in particular that of flammability, it has been proposed to utilize paint stripping compositions formulated with a halogenated hydrocarbon solvent. These materials, such as the chlorinated methanes and ethanes, including methylchloroform, trichloro- and tetrachloro ethylene, and the like, are well-known in the art for their substantial absence of flash points and low toxicity. From these standpoints, these materials are ideally suited for use in formulating paint stripping compositions. Difficulties have been encountered, however, in that frequently these halogenated hydrocarbons do not have the stripping effectiveness of the solvents previously used.

To overcome this difficulty, accelerators and activators have been added to the solvents to enhance their stripping powers. Exemplary of activators which have been used are organic acids, such as acetic acid. While these activators have been found to be effective in enhancing the stripping power of some of the chlorinated aliphatic hydrocarbon solvents, such as methylene chloride, ethylene dichloride, chloroform, 1,1,2-trichloroethane, 1,1,2,2-tetrachloroethane, and the like, most of them have not been found to be particularly effective with solvents such as trichloroethylene.

Those in the art will readily appreciate the advantages of using trichloroethylene rather than some of the other chlorinated hydrocarbon solvents. These advantages include the higher boiling point of trichloroethylene as compared to other solvents, such as methylene chloride. Accordingly, it would be desirable to be able to utilize trichloroethylene as the solvent in a paint stripping composition, if the trichloroethylene could be activated to have an enhanced stripping power so that stripping of paint or similar coatings could be achieved in a comparatively short period of time.

It is, therefore, an object of the present invention to provide a method for the removal of paints and similar protective films from surfaces, utilizing a stripping composition containing trichloroethylene as a solvent.

Another object of the present invention is to provide a method for removing paints and similar films from surfaces, which method also prevents oxidation or other deterioration of the paint-free surfaces.

A further object of the present invention is to provide a method as indicated hereinabove wherein the prevention of oxidation or similar deterioration of the paint-free surface is achieved while still maintaining the surface in condition to receive readily a more permanent protective coating.

Another object of the present invention is to provide a method for removing paints and similar films from surfaces wherein substantial loss of solvent from the stripping composition used is prevented.

These and other objects will become apparent to those skilled in the art from the description of the invention which follows.

Pursuant to the above objects, the present invention is a process wherein a surface containing a protective film is contacted with a composition comprising a chlorinated aliphatic hydrocarbon selected from the group consisting of trichloroethylene and perchloroethylene; ortho phosphoric acid; and a solubilizing agent for the phosphoric acid in the chlorinated aliphatic hydrocarbon, and maintaining the composition in contact with the surface for a period of time sufficient to loosen and preferably effect at least a partial removal of the film from the surface. In contacting the surface containing the protective film, the composition used may be at substantially room temperature, in which instance an emulsifying agent may be included in the composition, and the film residue may be removed from the surface by scraping, flushing with water, or the like. Alternatively, the stripping composition with or without an emulsifier may be at an elevated temperature so that the film residue is removed continuously from the surface and then is separated from the composition by various convenient means, as for example, by filtration. In this latter instance, which is preferred, the operation may be carried out in apparatus similar in design to a vapor degreaser. It is found that where a metal surface is being treated, once the film has been removed, there is deposited on the metal surface a phosphate coating which affords protection to the surface from oxidation or other types of deterioration until a new protective coating can be placed on the surface. Moreover, the phosphate coating which is deposited on the surface has no detrimental effect on subsequent protective films which may be applied to the surface.

It is to be appreciated that in referring to protective films or coatings, it is intended to refer to tenacious and normally water insoluble coatings, such as paint, enamel, varnish, lacquer, and the like. As is well-known to those in the art, these materials may be of diverse formulations, containing numerous substituents, including solvents, pigments, resins, and the like. Because of the large number of such coating compositions, for the sake of brevity hereinafter, these materials will be referred to collectively as protective films.

More specifically, the stripping composition used in the method of the present invention contains a major amount of a chlorinated aliphatic hydrocarbon. As has been indicated hereinabove, this chlorinated aliphatic hydrocarbon is selected from the group consisting of trichloroethylene and perchloroethylene. Preferably, the chlorinated aliphatic hydrocarbon solvent is present in a proportion within the range of about 65 to about 99 percent by weight of the total composition, with about 85 to about 97 percent being preferred. Frequently, excellent results have been obtained when using trichloroethylene and for this reason, specific reference hereinafter will be made to trichloroethylene as being the preferred chlorinated aliphatic hydrocarbon for use in the present method.

The ortho phosphoric acid in the stripping composition used in the method of the present invention may be various ortho phosphoric acids which will provide the desired amount of phosphoric acid in the composition. Generally, for convenience, the commercially available phosphoric acid containing about 85 percent by weight phosphoric acid is used. The amount of ortho phosphoric acid present in the composition will be at least that amount which is effective in activating the trichloroethylene so as to enhance its film stripping powers. Generally, the amount of phosphoric acid used will be within the range of about 0.05 to about 6 percent by weight of the total composition, with amounts within the range of about 0.6 to about 2 percent by weight of the total composition being specifically preferred.

In addition to the trichloroethylene and phosphoric acid, the stripping composition used in the method of the present invention includes one or more solubilizing agents for the phosphoric acid in the trichloroethylene. Exemplary of such solubilizing agents which may be used are the acid alkyl phosphates; aliphatic monohydroxy alcohols; alicyclic monohydroxy alcohols; halogenated alcohols, such as 2-chloroethanol; alkyl acetates such as ethyl acetate, amyl acetate; dioxane; monoethers of polyalkylene oxide glycols, such as the Cellosolves and Carbitols; ketones such as acetone and methylethyl ketone; and dialkylsulfoxides, such as dimethylsulfoxide. Of these, the various aliphatic and alicyclic monohydroxy alcohols are preferred. Typical examples of suitable alcohols include, the alcohols which contain between about 1 and about 18 carbon atoms, such as methyl alcohol, ethyl alcohol, n-propyl alcohol, isopropyl alcohol, n-butyl alcohol, isobutyl alcohol, tertiary butyl alcohol, tertiary amyl alcohol, octyl alcohol, decyl alcohol, lauryl alcohol, steryl alcohol, cyclohexyl alcohol, and mixtures thereof. Of these, excellent results have been obtained when using the aliphatic monohydroxy alcohols containing between about and about 8 carbon atoms, with n-butyl alcohol being specifically preferred. The solubilizing agent or agents are in the stripping composition in an amount at least sufficient to effect substantially complete solubilization of the phosphoric acid in the trichloroethylene. Generally, the solubilizing agent will be present in the composition in a proportion within the range of about 1 to about 35 percent by weight of the total composition, with about 3 to about 15 percent by weight of the total composition being preferred.

In addition to the above substituents, the stripping composition used in the present method may also contain various other materials, such as those which act as inhibitors or phosphate coating control agents, those which act as stabilizers for the composition, those which act as wetting agents, and the like. Exemplary of inhibitors or phosphate coating control agents which may be included in the composition are the nitrated organic compounds, such as nitrobenzene; glacial acetic acid; and the alkyl thioureas, such as N,N'-diethylthiourea. Generally, these materials will be present in the composition in amounts up to about 6 percent by weight of the total composition, e.g., about 0.1 to about 5.0 percent by weight. Exemplary of materials which may be added as stabilizers in the stripping composition are octyl phenol, diisobutylene, diethylthiourea, tertiary butylpyrocatechol, and the like. Generally, these stabilizers will be present in the composition in an amount up to about 15 percent by weight of the total composition, e.g., about 0.1 to about 14 percent by weight. Exemplary of the wetting or emulsifying agents which may be included in the composition are the alkylaryl sulfonates, such as the alkyl benzene sulfonates, and the alkyl sulfates or sulfonates. Exemplary of specific wetting agents which may be used are tetrapropylene benzene sodium sulfonate, dodecyl benzene sodium sulfonate, sodium lauryl sulfate, sodium nonylphenol ethoxysulfate, sodium isopropylnaphthalene sulfonate, potassium isobutyl benzene sulfonate, and the like. Generally, these materials will be present in the composition in amounts up to about 7 percent by weight of the total composition, e.g., about 0.1 to about 6.0 percent by weight.

With regard to the trichloroethylene, ortho phosphoric acid, and solubilizing agent, it will be appreciated that the numerical values given for the amounts of these substituents which may be in the stripping composition used in the present method are preferred ranges of these materials. Greater and lesser amounts of these substituents may be in the composition, depending upon the particular surface which is being treated. Similarly, with the coating control agents, the stabilizers, and the wetting agents, the numerical values given are preferred maximum amounts of these materials which will be in the stripping composition and greater amounts can be used, depending upon the protective film to be removed and the surface treated. In all instances, it will be appreciated that the amounts of the substituents in the composition will be those amouts which are effective in performing the functions for which they are intended, without detrimentally affecting efficiency of the composition or having a deleterious effect on the surface being treated. As a practical consideration, of course, amounts of these substituents greatly in excess of those required to perform the desired function usually will not be used.

In carrying out the process of the present invention, the surface from which the protective film is to be removed is brought into contact with the stripping composition as has been described hereinabove. It will be appreciated that although the surface treated is most frequently a metal surface, other surfaces, such as wood, glass, and the like, may also be treated to remove protective films in accordance with the present method. Preferably, contact between the surface containing the protective film to be removed and the stripping composition is effected by dipping or immersing the surface into the composition. Other contacting techniques, such as brushing, spraying, or the like, may be used, provided they assure sufficient contact time between the surface and the composition to effect substantial removal of the protective film. Generally, it has been found that this desired contact time is more easily achieved by using immersion or dipping techniques and for this reason, these methods of effecting contact between the stripping composition and the surface from which the protective film is to be removed are preferred.

During the time of contact between the surface to be treated and the stripping composition, the composition is at an elevated temperature above room temperature, i.e., above about 20 degrees centigrade, at atmospheric pressure, e.g., above about 30 degrees centigrade. In the most preferred operation of the present process, the stripping composition is maintained at about the boiling point, i.e., about 85 degrees centigrade, at atmospheric pressure. It will be appreciated, however, that the present process may be carried out at temperatures which are higher or lower than those which have been specifically set forth and that operations at sub- and superatmospheric pressures are also feasible and are within the scope of the present method. It is desirable, in order to obtain the most efficient film stripping, that the temperatures used are not more than about 40 degrees centigrade below the boiling point of the solvent. The surface from which the protective film is to be removed is maintained in contact with the stripping composition for a period of time which is sufficient to effect the desired removal of the film from the surface. In the practice of the present method, contact times of 5 seconds to 15 minutes, preferably of about 1 to about 7 minutes, have been found to be typical.

It will be appreciated that the present process may be operated either as a batch process or on a continuous basis.

Particularly, where the surface being treated is a metal surface, such as iron, steel, zinc, aluminum, magnesium, cadmium and the like, the process of the present invention has been found to be readily adapted for incorporation in a continuous process involving various other metal surface treating operations, including degreasing, phosphatizing and painting. In such an operation, the metal surfaces to be treated may be immersed in the paint stripping composition in accordance with the method of the present invention. Thereafter, after removal of the protective film from the surfaces, the surfaces may be passed sequentially through a vapor degreasing operation, through a phosphatizing operation and, finally, through a painting operation. In such a process, the surface to be treated, on a conveyor line, may be subjected to these various treating operations, continuously, without the necessity of removing the surface from the conveyor between the subsequent treating steps. It will be appreciated, that the phosphatizing operation, indicated hereinabove, may possibly be eliminated, depending on the end use of article and the properties desired, inasmuch as the surfaces under treatment obtain a phosphate coating in undergoing the film stripping process of the present invention. Similarly, the degreaser operation may precede the film stripping operation or even may be eliminated entirely, since, frequently, the surfaces are ready for painting with no additional treatment. In this respect, it is to be noted that because of the phosphate coating which is deposited on metal surfaces being treated during the film stripping operation of the present invention, such surfaces may be stored, without undergoing oxidation or similar surface deterioration, where subsequent treating steps such as painting, or the like, are not immediately employed. Not only does the phosphate coating placed on these surfaces treated, during the removal of the protective film, prevent surface oxidation or similar surface deterioration but, as indicated hereinabove, it provides an excellent base for subsequent protective films applied to the surfaces.

In order that those skilled in the art may better understand the method of the present invention and the manner in which it may be practiced, the following specific examples are given. In these examples, unless otherwise indicated, temperatures are in degrees centigrade, parts are by weight, and percentages are in percent by weight of the total composition.

*Example 1*

A film stripping composition was formulated by admixing the following substituents in the following amounts:

| | Milliliters |
|---|---|
| Trichloroethylene | 2,000 |
| Normal butyl alcohol | 230 |
| Ortho phosphoric acid (85%) | 20 |
| Nitrobenzene | 5 |

This composition was maintained at the boiling point, about 85 degrees centigrade, and 3″ x 5″ steel panels coated with a white, baked alkyd enamel were immersed in the boiling solution and maintained there for a period of seven minutes. On removal of the panels from the solution, it was found that the paint had been completely removed from the panels and the bare steel had received a thin, adherent, blue-gray phosphate coating.

*Example 2*

By way of comparison, the procedure of Example 1 was repeated with the exception that instead of the film stripping composition, dilute aqueous solution of phosphoric acid was used. This phosphoric acid solution, containing 10 milliliters of $H_3PO_4$ in 1 liter of water, was maintained at a temperature of about 85 degrees centigrade and the steel panels were immersed in the solution for a period of about 5 minutes. Upon removing the panels from the acid solution, it was found that the acid had substantially no effect on the paint, the only noticeable effect being a slight softening of the paint.

*Example 3*

The procedure of Example 1 was again repeated, this time with the exception that instead of the film stripping composition, only trichloroethylene containing 10 percent by weight of normal butyl alcohol was used. The trichloroethylene was maintained at the boiling point, about 85 degrees centigrade, and the test panels were maintained in the boiling trichloroethylene for a period of about 7 minutes. Upon removing the panels from the trichloroethylene, it was noted that although there was evidence of some blistering, there was no appreciable loosening of the paint film.

*Example 4*

The procedure of Example 1 was repeated, using the film stripping composition as described in Example 1. A number of 3″ x 5″ steel test panels were painted with various commerical coatings as follows: white, black and clear acrylic lacquers; green short oil alkyd enamel; white melamine baking enamel; walnut urea-formaldehyde baking enamel; blue long oil alkyd baking enamel; and gray $TiO_2$ base steel paint. These panels were immersed in the boiling film stripping composition, at a temperature of about 85 degrees centigrade, for periods of about 2 to about 5 minutes. In each instance, the coating was completely removed from the panel and the bare steel had a visible phosphate coating.

When following the procedure of Examples 1 and 4, other metals or substrates, e.g., zinc, galvanized steel, cadmium, aluminum, plastics, are coated with paints and lacquers, and perchloroethylene is substituted for the trichloroethylene, other solubilizing agents, such as the acid alkyl phosphates, ethyl alcohol, octyl alcohol, ethyl acetate, dimethyl acetamide, acetone, and dimethyl sulfoxide, are substituted for the normal butyl alcohol, other inhibitors, such as glacial acetic acid, and the alkyl thioureas are substituted for the nitrobenzene, and other stabilizers, such as diisobutylene, and tertiary butylpyrocatechol, are substituted for the octyl phenol, substantially the same removal of paint or film coating is obtained.

The advantageous results obtained by using the process of the present invention are clearly shown in the above examples, and in particular, by a comparison of the results obtained in Examples 1 through 3. These results show that neither the trichloroethylene nor the phosphoric acid, alone, had any appreciable effect on removing the protective film from the metal surfaces treated. In contrast, however, when the surface containing the protective film was contacted with a stripping composition containing both the trichloroethylene and the phosphoric acid, complete removal of the film from the surface was obtained in a comparatively short period of time. The surprising synergism of the combination of trichloroethylene and phosphoric acid in a film stripper is believer clearly to be evidenced by the above results.

While there have been described various embodiments of the invention, the compositions and methods described are not intended to be understood as limiting the scope of the invention, as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method for removing tenacious, normally water-insoluble protective films selected from the group consisting of paint, enamel, varnish and lacquer films from surfaces bearing such films which comprises contacting such surface with a composition comprising a chlorinated aliphatic hydrocarbon selected from the group consisting of a dichloroethylene and perchloroethylene, ortho phosphric acid and a solubilizing agent for the acid in the hydrocarbon, and maintaining the composition in contact with the surface for a period of time sufficient to loosen protective film from the surface.

2. The method of claim 1 wherein the protective film is removed from the surface and a phosphate coating is applied to the surface from which the film is removed by the compositions.

3. The method as claimed in claim 1 wherein the chlorinated aliphatic hydrocarbon is trichloroethylene and the solubilizing agent is normal butyl alcohol.

4. The method as claimed in claim 3 wherein the composition with which the film bearing surface is contacted also contains a small but effective amount of a phosphate coating control agent.

5. The method as claimed in claim 4 wherein the composition is at an elevated temperature above room temperature and the surface from which the film is to be removed is immersed in the composition.

6. A method of removing tenacious, normally water-insoluble protective films selected from the group consisting of paint, enamel, varnish and lacquer films from surfaces bearing such films which comprises contacting such surfaces with a composition comprising from about 65 to about 99 percent by weight of a chlorinated aliphatic hydrocarbon selected from the group consisting of trichloroethylene and perchloroethylene, from about 0.5 to about 6.0 percent by weight of ortho phosphoric acid, from about 1 to about 35 percent by weight of a solubilizing agent for the acid in the hydrocarbon, up to about 6 percent by weight of a phosphate coating control agent, and up to about 15 percent by weight of a stabilizer, said composition being at an elevated temperature, maintaining said composition in contact with the surface for a period of time sufficient to effect at least a partial removal of the film from the surface, and imparting a phosphate coating to that portion of the surface from which the film is removed.

7. The method as claimed in claim 6 wherein the chlorinated aliphatic hydrocarbon is trichloroethylene, the solubilizing agent is normal butyl alcohol, the phosphate coating control agent is nitrobenzene, and the stabilizer is octyl phenol.

References Cited

UNITED STATES PATENTS

| 2,755,209 | 7/1956 | Duncan | 134—38 |
| 2,852,471 | 9/1958 | Atkins et al. | 134—38 |
| 2,938,111 | 5/1960 | Leithauser | 134—38 |
| 3,197,345 | 7/1965 | Vullo et al. | 148—6.15 |
| 3,220,890 | 11/1965 | Vullo et al. | 148—6.15 |

FOREIGN PATENTS 834,707  5/1960  Great Britain.

OTHER REFERENCES

Degreasing for Phosphating Processes; Metal Industry, vol. 96, No. 1 January 1960, p. 13.

ALFRED L. LEAVITT, *Primary Examiner.*

RALPH S. KENDALL, *Examiner.*

UNITED STATES PATENT OFFICE
CERTIFICATE OF CORRECTION

Patent No. 3,338,756  August 29, 1967

Edward Leon

It is certified that error appears in the above identified patent and that said Letters Patent are hereby corrected as shown below:

Column 3, lines 41 and 42, "between about and about 8" should read -- between about 3 and about 8 --. Column 4, lines 25 and 26, "detrimentally affecting efficiency" should read -- detrimentally affecting the stripping efficiency --. Column 7, line 1, "dichloroethylene" should read -- trichloroethylene --; line 28, "0.5" should read -- 0.05 --.

Signed and sealed this 23rd day of December 1969.

(SEAL)
Attest:

Edward M. Fletcher, Jr.  WILLIAM E. SCHUYLER, JR.
Attesting Officer  Commissioner of Patents